United States Patent [19]

Bean et al.

[11] Patent Number: 5,605,570
[45] Date of Patent: Feb. 25, 1997

[54] ALKALI-ACTIVATED GLASSY SILICATE FOAMED CONCRETE

[75] Inventors: Dennis L. Bean; Philip G. Malone, both of Vicksburg, Miss.

[73] Assignee: U.S. Army Corps of Engineers as represented by The Secretary of the Army, Washington, D.C.

[21] Appl. No.: 504,623

[22] Filed: Jul. 20, 1995

[51] Int. Cl.$^6$ ................................ C04B 38/02; C04B 7/14
[52] U.S. Cl. .................... 106/673; 106/789; 106/790; 264/333; 427/427
[58] Field of Search ................................. 106/673, 679, 106/789, 790; 264/333; 427/427

[56] References Cited

U.S. PATENT DOCUMENTS

| | | | |
|---|---|---|---|
| 2,024,791 | 12/1935 | Adolph et al. | 106/672 |
| 3,095,312 | 6/1963 | Holmes | 106/603 |
| 3,118,778 | 1/1964 | Rodis et al. | 106/679 |
| 3,133,820 | 5/1964 | Powell | 106/679 |
| 4,306,912 | 12/1981 | Forss | 106/707 |
| 4,369,054 | 1/1983 | Shinholster, Jr. et al. | 106/679 |
| 4,545,797 | 10/1985 | Elattar | 106/679 |
| 4,659,385 | 4/1987 | Costopoulos et al. | 106/673 |

FOREIGN PATENT DOCUMENTS

| | | | |
|---|---|---|---|
| 52-018726 | 2/1977 | Japan | 106/673 |
| 58-20898 | 4/1983 | Japan | 106/679 |

OTHER PUBLICATIONS

"Microstructure, strength & reaction products of ground granulated blast–furnace slag activated by highly concentrated NaOH solution" by Schilling et al., J. Mater. Res., vol. 9, No. 1, Jan. 1994, pp. 188–197.

Primary Examiner—Anthony Green
Attorney, Agent, or Firm—Luther A. Marsh

[57] ABSTRACT

The invention pertains to a cementious composition of a strong, light, foamed silicate binder or concrete made from ground, calcium-rich glassy silicates that are the major component of blast-furnace slag. The other materials used to create the material are sodium peroxide and water. The cementious mixture can include a volume modification foaming agent that substitutes a part of the mixture. These agents include sodium hydroxide, potassium hydroxide and hydrogen peroxide.

6 Claims, No Drawings

ALKALI-ACTIVATED GLASSY SILICATE FOAMED CONCRETE

The invention described herein may be manufactured and used by or for the United States Government for governmental purposes without the payment of any royalties thereon.

FIELD OF THE INVENTION

The present invention is a convenient new system for producing a foamed concrete that can be cast or placed on a building site. More particularly, it is a new system for producing strong, light, foamed binder or concrete from ground, glassy silicates, such as blast-furnace slag.

BACKGROUND OF THE INVENTION

Foamed concrete is usually made by introducing a water-based, gas-filled foam into a paste that is typically formed with water and portland cement alone or portland cement with a fine, lightweight aggregate. The foamed paste hardens to form a low-density concrete that is used in either flooring or roofing applications where either thermal insulation or acoustical damping is required. Previously, portland cement was the preferred material used to produce foamed concrete. The foam structure was developed by adding gas-generating chemical to the portland cement paste or by mixing a preformed, water-based foam into the cement paste. Portland cement-based, foamed concretes are typically slow to cure and have relatively low strength. Reactive glass-based binder foams generally cure faster and have greater strength.

Foamed concretes are typically made using any of three well-known methods. The method using preformed foam requires that portland cement be mixed with a preformed aqueous foam that is produced using a commercial foaming agent. The usual foaming agents are hydrolyzed proteins. This approach requires a foam generator be on location to make the foam. Limitations of this technique are: i) the densities of a final foamed concrete produced is often non-uniform since the foam density used is not always the same; and ii) the foam begins to collapse from the moment it is formed since the foam is not self-generating.

A second method uses chemicals that are mixed with the portland cement to generate gas in the mixture. One of the most useful of these systems involves mixing hydrogen peroxide and calcium hypochlorite with cement and adding a foaming agent. The hydrogen peroxide and the calcium hypochlorite react to release oxygen and form calcium chloride solution. The limitations of this technique and cementious composition is the presence of chloride ions inherent in such a process which is unacceptable where steel reinforcement is used in the cement-based structure. Examples of this technique include U.S. Pat. No. 2,024,791 entitled "Process for the Manufacture of Masses and Articles Having A Porous Cellular Structure."

Also, this U.S. Pat. No. 2,024,791 discusses the use of powdered aluminum in a prior cement paste that will react with a lime-based cement that will release in the hydration process hydrogen gas that foams the cement paste. This aluminum-based foaming agent has an inherent limitation of being used in a non-uniform mixture where lack of uniform density may result and requires use of a portland-based cement that requires several days for curing. Hydrogen gas produced in the reaction may form an explosive mixture in air.

U.S. Pat. No. 3,095,312 entitled "Porous Foamed Silicate Products," teaches of using a comparable hydrogen peroxide or alkali metal peroxide gas foaming technique using water soluble inorganic metal silicates as the cementious based material along with a foaming additive of paraformaldehyde. Paraformaldehyde is a potential carcinogen that is harmful to humans and which is not desirable in construction areas.

U.S. Pat. No. 4,659,385 entitled "Building Material Manufacturing from Fly Ash" teaches of a comparable hydrogen peroxide gas foaming technique using fly ash with a water-miscible bonding agent that is preferably a polyvinyl acetate resin and an air entrainer.

A third method of production is the excess water system in which a water absorber, such as ground shale or diatomaceous earth, is used to retain water in the mixture, and the excess water is driven off during autoclave curing. This approach requires autoclave processing and cannot be adapted for onsite placement of the foamed concrete.

To overcome the limitations discussed above, the instant invention herein teaches of cementious-based composition that solves these problems while using inexpensive materials without the use of portland cements in the production thereof.

SUMMARY OF THE INVENTION

The cementious composition of the instant invention produces a strong, light, foamed concrete from ground, calcium-rich glassy silicates that are the major component of blast-furnace slag. The foamed alkali-activated glass system has the advantages of: i) no foam generator requirements at the work site; ii) the foamed concrete is based on a composition using blast-furnace slag waste products or other metallurgical slags; iii) the foamed concrete consists of only three components of ground calcium-rich slag, sodium peroxide, and water where the sodium peroxide when reacted with water generates sodium hydroxide that in turn activates the finely-ground glass and oxygen gas to produce an expansion for the desired porous characteristic; iv) the alkali-activated slags harden and gain strength rapidly so that foam can be placed in successive layers, i.e. lifts, in a rapid manner without collapsing earlier layers of a deposited foamed concrete; v) no foam stabilizing agent is required to make the desired composition; and vi) no explosive gases are produced by the hydrated composition.

DETAILED DESCRIPTION OF THE INVENTION

Sodium peroxide is a dry, yellowish solid that is stable in dry air but decomposes in water to produce oxygen gas and sodium hydroxide. The reaction proceeds as follows:

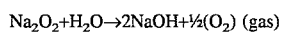

$$Na_2O_2 + H_2O \rightarrow 2NaOH + \tfrac{1}{2}(O_2) \text{ (gas)}$$

Approximately 78 grams of sodium peroxide will combine with 18 grams of water to produce 80 grams of sodium hydroxide and 16 grams of oxygen. The quantity of oxygen produced amounts to a volume of 11.2 liters at standard temperature and pressure (STP). When a solution of sodium hydroxide is mixed with ground reactive calcium-rich glassy slag, the slag is partly dissolved and reprecipitates to form strong bonds between glass particles and between glass particles and aggregates in the slag. These alkali-activated calcium rich glass slags set quickly and gain strength rapidly. The metallurgical slags that are the preferred materials for the manufacture of foamed slag concretes are of the type described in "Process For Producing a Binder for Slurry, Mortar & Concrete" by Forss in U.S. Pat. No. 4,306,912 which is hereby incorporated by reference. The family of slags that are useful are those with a chemical composition such that:

$$\frac{CaO + CaS + 1/2\, MgO + Al_2O_3}{SiO_2 + MnO} > 1.9$$

These are typically referred to as calcium-rich glasses or slags. To be useful, these materials must be more than 95% glassy or less than 5% crystalline. This differs from portland cement that is typically 98% to 78% crystalline. Although fly ash and slag both contain glassy calcium silicates, this teaching makes known that fly ash cannot be used in place of slag to form strongly cementitious materials as discussed in Example 5 therein. A further critical requirement of the instant invention is that the glassy slag material be ground to a specific surface area of at least 400 square meters/kilogram for proper reaction to occur.

A typical formulation for an alkali-activated glassy slag-based foaming binder requires mixing: i) 3 to 8% by mass sodium peroxide with ii) a calcium-rich, ground, glassy slag. A workable mixture requires a water-to-slag ratio of 0.25 to 0.40 mass of slag. Useful formulations for foaming binder or concrete are in the ranges:

100 grams of slag
5 grams of sodium peroxide
35 to 40 grams of water

The decomposition of the 5 grams of sodium peroxide will produce 5.12 grams of sodium hydroxide and consume 1.15 grams of water. The reaction will generate 1.02 grams of oxygen or 718 ml volume at STP. The resulting NaOH solution will involve 34 to 39 grams of water and will be a 12 to 13% solution that is approximately 3.5 molar.

COMPARATIVE TEST RESULTS

A small amount of slag/sodium peroxide mixture was prepared. A 200-gram aliquot of ground-granulated slag obtained from Blue Circle Inc., Sparrow Point, Md. was ground in a mortar and pestle with 10 grams of reagent-grade granular sodium peroxide. The grinding was done to thoroughly mix the two components. Two 20-gram samples of the mixture were weighed out into glass beakers. One sample was mixed with 8 ml of solution that contained a 1:15 mixture of foaming agent (Cellufoam WF 304, Cellufoam Concrete Systems, Toronto, Canada) in tap water. The second sample was mixed with 8 ml of tap water. The two samples were prepared simultaneously. After mixing, the beakers containing the samples were covered with watch glasses at 23° C. Both of the samples became slightly warm, and the volume of the wet samples increased approximately 3 times, from approximately 10 ml to over 30 ml. The samples had an initial gray color. Later observations showed that the sample prepared with only water with no foaming agent present became firm and could not be poured from the beaker. The sample prepared with the foaming agent was definitely softer, but could not be poured from the beaker. The beakers were uncovered and placed down inside larger beakers that contained a small amount of tap water. Watch glasses were used to close the tops of the larger beakers. In this way the samples were maintained in a moist atmosphere.

After 24 hours, the samples were examined again. The sample of the slag prepared with the tap water had become very hard, and it was impossible to produce an indentation on the surface with a flexible polyethylene pipette. The sample prepared with the foaming agent was firm but could be easily broken up with a pipette. The sample prepared with the tap water changed from its initial gray color to an olive green. The sample prepared with the foaming solution remained gray. After 48 hours, an attempt was made to remove the sample prepared with tap water from the beaker in which it had been prepared. The sample had expanded and was adhering tightly to the borosilicate glass. The foamed slag had an average pore size in the range of 0.1 to 0.3 mm. The sample prepared with the foaming agent could be easily broken up and removed from the beaker. No observable shrinkage occurred.

The basic foaming reaction can be adapted to produce less gas by adding alkalies such as sodium hydroxide or potassium hydroxide to the sodium peroxide so that activation is achieved with less gas production. The reaction can be adapted to produce more gas by substituting a hydrogen peroxide solution for the water used in making up the mixture. For example, in the mixture using 100 grams of slag, 4 grams of sodium hydroxide and 1 gram of sodium peroxide can be used in place of the 5 grams of sodium peroxide in the example mixture. The cementing reaction would proceed at the same rate with only 0.2 times the volume of gas available for foaming. Similarly if 30 grams of 3% hydrogen peroxide is substituted for water, the mixture will generate an additional 0.42 grams of oxygen (295 ml at STP) for foaming and the reaction would proceed at the same rate. In this way it is possible to regulate the volume and density of the foamed binder produced.

Other reactive calcium-rich glassy, silicate materials can be substituted for slag. The foaming system can be run at ambient temperatures or can be heated to accelerate the curing process. Aggregates such as quartz sand, clays, or bauxite may be added to the mixture to produce a variety of products with different densities. Fibers that are typically used to reinforce concrete may be added to the mixture. Reinforcement can be done by adding fibers made from glass, steel, or organic materials such as nylon. The foamed concrete can be either cast in a mold or blown in-situ under pressure on-location at the building site.

While this invention has been described in terms of a specific preferred embodiment, it is understood that it is capable of further modification and adaptation of the invention following in general the principle of the invention and including such departures from the present disclosure as come within the known or customary practice in the art to which the invention pertains and may be applied to the central features set forth, and fall within the scope of the invention and of the limits of the appended claims.

We claim:
1. A cementious building material produced by the method comprising the steps of: preparing a mixture consisting essentially of:
   (a) ground calcium-rich glassy slag,
   (b) 0.03 to 0.08 parts sodium peroxide by weight of the slag ground therewith,

(c) water with a water-to-slag ratio of 0.25 to 0.40 by weight; and allowing the mixture to foam and harden.

2. The cementious building material of claim 1 further including aggregates that are added to the mixture for varying the density of the building material, the aggregates are selected from quartz, sand, clay, or bauxite.

3. The cementious building material of claim 1 further including fibers that are added to the mixture for reinforcement of the building materials, the fibers are selected from the group consisting of glass, steel, and organic polymer materials.

4. A method of producing a cementious building material comprising the steps of:

preparing a mixture consisting essentially of: 0.03 to 0.08 by weight sodium peroxide; ground calcium-rich glassy slag, and water with a water-to-slag ratio of 0.25 to 0.40 by weight; and allowing the mixture to cure.

5. The method of claim 4 including the step of placing the mixture in a form prior to curing.

6. The method of claim 4 including the step of blowing the mixture under pressure onto a surface prior to curing.

* * * * *